United States Patent
Good et al.

(10) Patent No.: US 9,500,815 B2
(45) Date of Patent: Nov. 22, 2016

(54) FIBER OPTIC CONNECTOR WITH POWER

(71) Applicant: NEXANS, Paris (FR)

(72) Inventors: Paul Michael Good, New Holland, PA (US); Paul Vanderlaan, New Holland, PA (US)

(73) Assignee: NEXANS, Paris (FR)

(*) Notice: Subject to any disclaimer, the term of this patent is extended or adjusted under 35 U.S.C. 154(b) by 124 days.

(21) Appl. No.: 14/496,703

(22) Filed: Sep. 25, 2014

(65) Prior Publication Data

US 2016/0091673 A1 Mar. 31, 2016

(51) Int. Cl.
G02B 6/38 (2006.01)
G02B 6/40 (2006.01)

(52) U.S. Cl.
CPC .......... *G02B 6/3883* (2013.01); *G02B 6/3817* (2013.01); *G02B 6/3825* (2013.01); *G02B 6/3882* (2013.01); *G02B 6/3885* (2013.01); *G02B 6/403* (2013.01); *G02B 6/3895* (2013.01)

(58) Field of Classification Search
CPC G02B 6/3825; G02B 6/3883; G02B 6/3885; G02B 6/3895; G02B 6/403; G02B 6/3817; G02B 6/3882

USPC .......... 385/53–89; 439/147, 488, 577, 608, 439/660, 676, 686, 689, 931
See application file for complete search history.

(56) References Cited

U.S. PATENT DOCUMENTS

| | | | | |
|---|---|---|---|---|
| 4,597,631 A | * | 7/1986 | Flores | G02B 6/3817 385/53 |
| 6,599,025 B1 | * | 7/2003 | Deutsch | G02B 6/3817 385/75 |
| 2010/0190366 A1 | * | 7/2010 | Fitzpatrick | H01R 13/64 439/147 |
| 2013/0039624 A1 | * | 2/2013 | Scherer | H01R 9/032 385/92 |

* cited by examiner

*Primary Examiner* — Akm Ullah
*Assistant Examiner* — Michael Mooney
(74) *Attorney, Agent, or Firm* — Sofer & Haroun, LLP (57) ABSTRACT

A fiber optic connector is provided for a multi fiber cable includes a housing, a strain relief, a ferrule, two guide arrangements configured to accept guide pins from an opposing connector, and a conductor coupled to each of the guide pin arrangement, configured to conduct electricity to the guide pin arrangements.

12 Claims, 8 Drawing Sheets

FIG. 1C

FIG. 3A
Standard Connector Block
(Prior Art)

FIG. 3B
Modified Jumper Connector Block

FIBER OPTIC CONNECTOR WITH POWER

BACKGROUND

Field of the Invention

This application relates to fiber optic connectors. More particularly, this application relates to fiber optic connectors with power.

Description of Related Art

The proliferation of networked devices (wireless access points, IP security cameras, IP phones, etc. . . . ) in remote locations has driven a need to provide power and bandwidth to locations normally lacking power outlets. In response to this, the Institute of Electrical and Electronics Engineers (IEEE) has created a standard for providing direct current power over twisted-pair cables. This standard, IEEE 802.3, provides guidelines for both the equipment that provide power and the devices using the power.

Such arrangements provide significant cost savings to end users since one cable can provide both data transmission and power to the remote device. The use of one cable saves on parts, materials and labor. However, increasing demand for network speeds and bandwidth consumption at these remote location devices are now stretching beyond the capabilities of typical twisted-pair cables. The use of fiber optics can extend the reach and aid in the placement of wireless access point devices normally beyond the reach of standard twisted pair cabling while providing greater bandwidth capabilities.

For example, Power over Ethernet (PoE), Power over Ethernet Plus (PoE+) and the next generation of PoE cables are focused on twisted pair technology. This limits data rates to 10 Gb/s and distances to 100 m.

OBJECTS AND SUMMARY

The use of fiber optic cables can extend the reach to remote devices well beyond 100 m and at better data rates allowing for the servicing of larger infrastructures such as parking lots, stadiums and common areas by a centralized location, minimizing points of network failure or intrusion. The present arrangement looks to provide a fiber optic connector capable of supporting a combination fiber/power cable to meet this need.

To this end a fiber optic connector for a multi fiber cable includes a housing, a strain relief, a ferrule, two guide arrangements configured to accept guide pins from an opposing connector, and a conductor coupled to each of the guide pin arrangement, configured to conduct electricity to the guide pin arrangements.

BRIEF DESCRIPTION OF DRAWINGS

The present invention can be best understood through the following description and accompanying drawings, wherein.

DETAILED DESCRIPTION

Figures 1A, 1B:
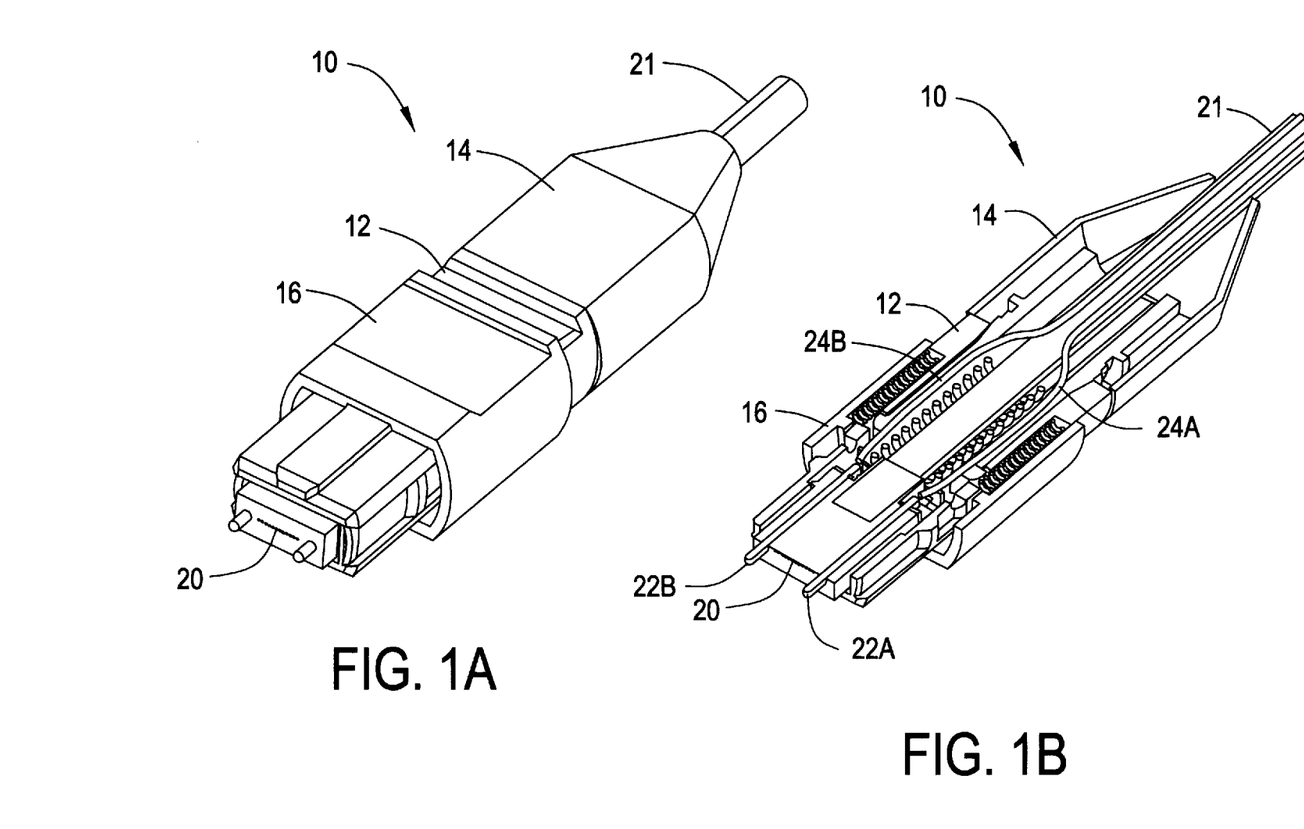
FIGS. 1A-1C illustrate one example of a power supporting fiber optic connector, in accordance with one embodiment.

In accordance with one embodiment of the present invention, FIGS. 1A and 1B, illustrate a modified male MPO (Multiple-fiber Push-On/Pull-Off) type connector 10. Connector 10 has a housing 12, a strain relief 14, quick disconnect 16 and a ferrule 20 for aligning the fibers from a multi-fiber cable 21. Two locating pins 22 are configured to be inserted into locating guide slots on an opposing female MPO type connector to properly align the fibers within connector 10.

In accordance with one embodiment, within connector 10, one of the locating pins 22A is configured to conduct positive voltage to an appropriately sized receptacle located in an adjoined connector, for example in the corresponding female locating pin reception slot. The second locating pin 22B (and associated socket in an adjoining connector) provides the neutral circuit path. As shown in FIGS. 1A and 1B, corresponding current carrying wires 24A and 24B electrically connect the back end of guide pins 22A and 22B and extend through housing 12 and strain relief backing 14 out through the rear of connector 10, through cable 21.

Figure 1C:
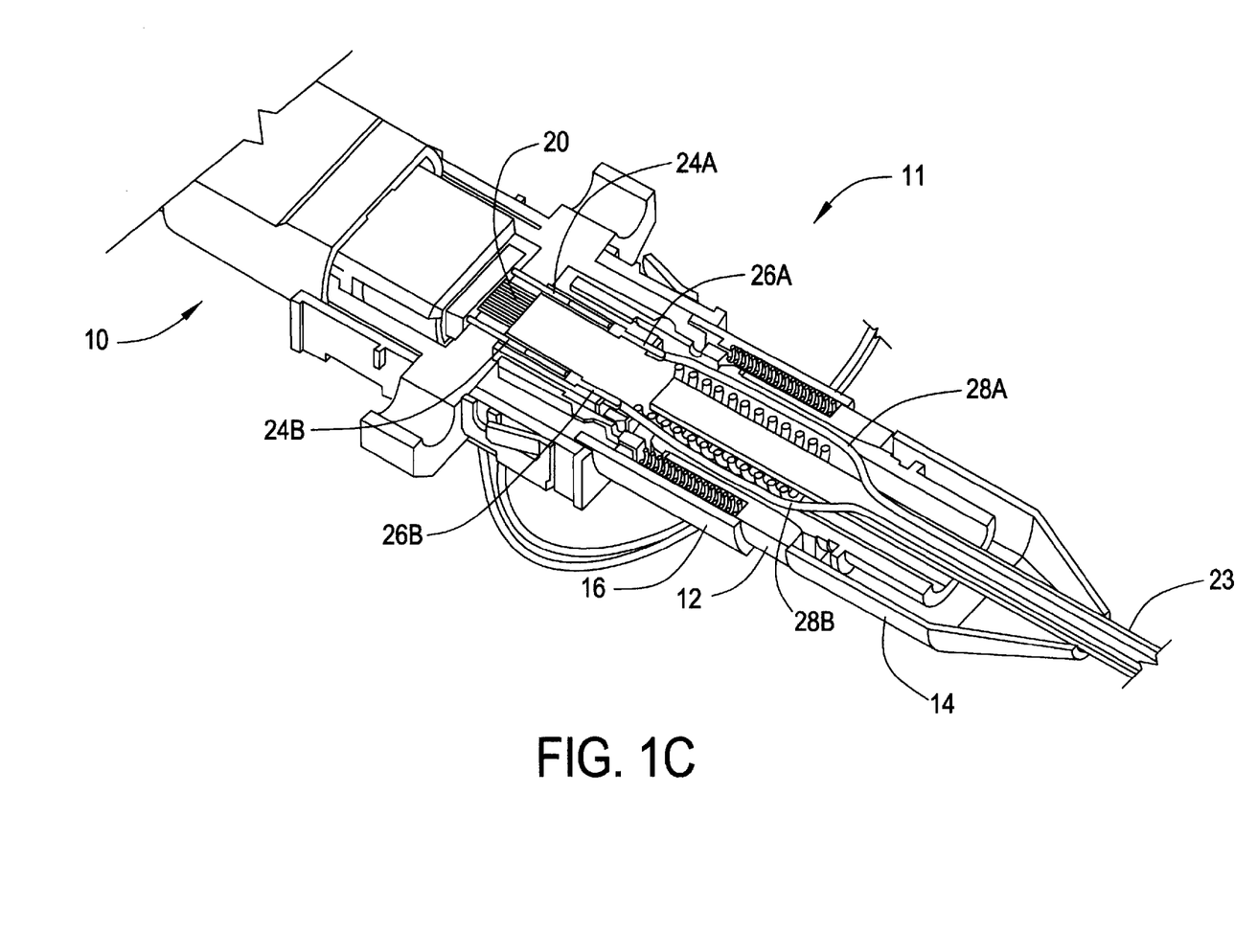

It is noted that in prior art type MPO connectors, open guide holes in female connectors typically do not have conductive elements. In the present arrangement as shown in FIG. 1C, an female MPO connector 11 is shown with open guide pin slots 26A and 26B that are constructed having electrically conductive material therein, with corresponding conductive elements 28A and 28B passing back through connector 11 to cable 23 to provide conductive channels, similar to elements 24A and 24B as shown in FIG. 1B.

Such an arrangement as shown is able to support and connect with a composite cable such as a cable including both a multi fiber bundle (e.g. twelve fiber tube) as well as an associated copper power conductor arrangement, where the two copper conductor elements can be connected to either one of 24A/24B in a male connector 10 or 28A/28B in a female connector 11. It is noted that ferrules 20 are typically constructed from a ceramic material that have insulative properties such that the power moving through pins 22A/22B or slots 26A/26B does not affect the light signals passing through the fibers in ferrules 20.

In another embodiment a connector 110 may be provided that uses both locator pins for one current path, such as the positive current path so that more power can be delivered more efficiently. As described below, the neutral path for the circuit would employ conductive components in the housing of the connectors. The neutral signal could then travel through additional conductive components in the adapter block that touches the housing. Thus the signal passes from one connector's housing, to the adapter block and into the next connector.

Figures 2A, 2B:
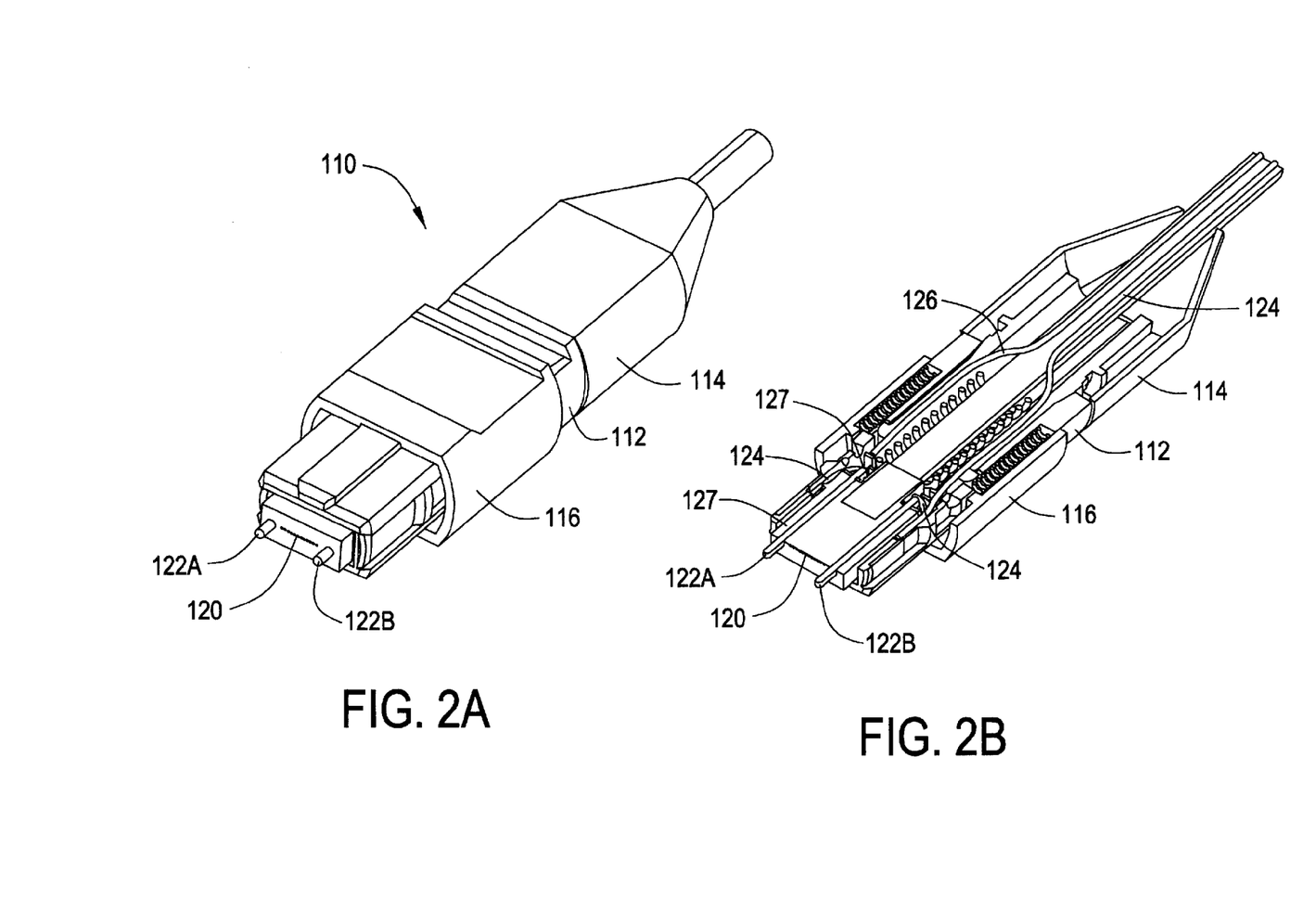
FIGS. 2A and 2B illustrate another example of a power supporting fiber optic connector, in accordance with one embodiment.

For example, FIGS. 2A and 2B illustrate a connector 110 that is provided where both locating pins 122A and 122B simultaneously conduct current from a single voltage source, for connecting with an appropriately sized female guide pin sockets in an adjoined connector. As with connector 10, connector 110 maintains the same housing 112, strain relief backing 114, quick disconnect press release 116 and front end ferrule 120.

Unlike the first embodiment, both pins 122A and 122B are connected to a single connection wire 124 that is to be connected to one wire in the attached cable. As shown in FIG. 2B, wire 124 connects up from the rear of connector 110 to pin 122B, but also extends under ferrule 120 to the other side and additionally connects to pin 122A. Thus, the entire current path for that wire from the associated power cable flows through both pins 122. In this arrangement, the other current path, such as the neutral path, is not run through guide pins 122 but instead is provided by a combination of the return wire 126 running back for electrical connection with the neutral current path in the connected cable as well as a metallic sheath 127 that is positioned around ferrule 120. As noted above, the neutral path flows through wire 126, metallic sheath 127 which in turn utilizes any conductive components outside the pin path within the connector block (See FIGS. 3A and 3B) and then onto the corresponding components in the opposing connector.

In another embodiment, the present arrangement may be further employed in a situation with two female MPO connectors 11. Here as there are no pins on either connector 11 a modification is made to the standard connection block to complete the electrical circuit path.

Figures 3A, 3B, 3C:
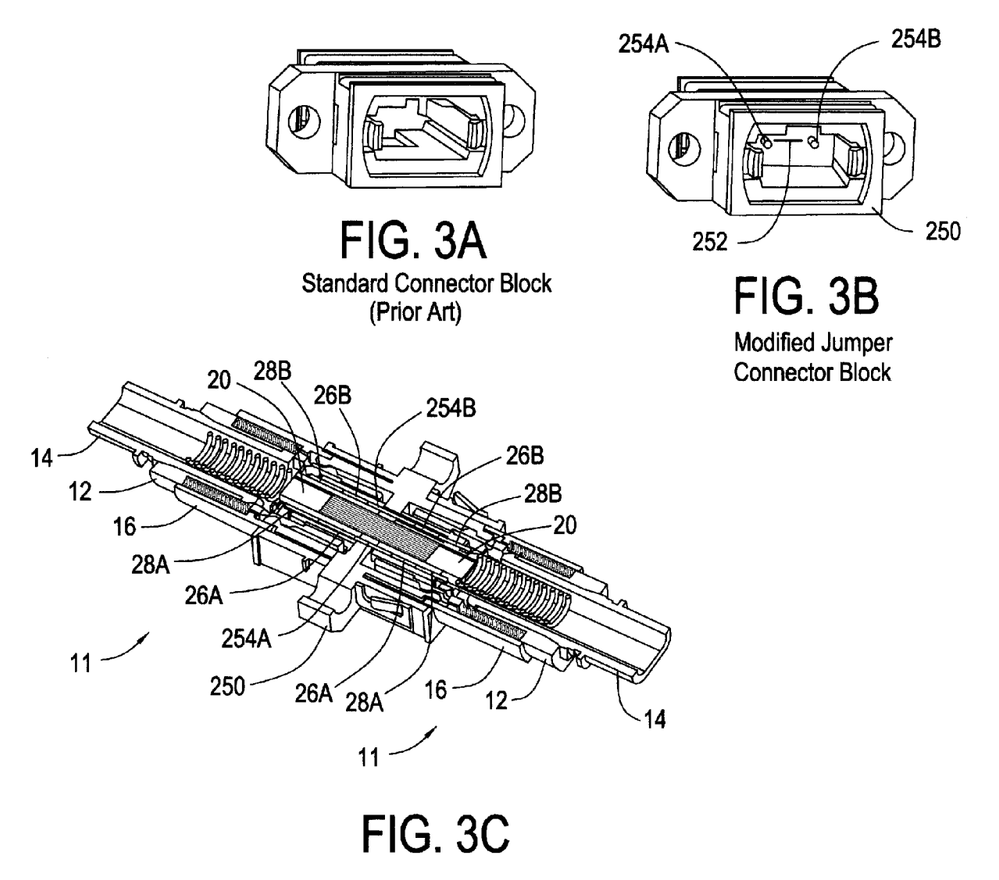
FIGS. 3A-3D illustrate another example of a power supporting fiber optic connector and connection block, in accordance with one embodiment.

For example, in FIGS. 3A-3C a modified connector block 250 is shown. Typically all MPO type connectors are fitted together using a connector block (Prior Art FIG. 3A) with a male MPO on one side and female MPO on the other side. The typical connector block has an opening in the center that allows the two connectors to interface in an aligned manner in the center. In the present arrangement, as shown in FIG. 3B, connector block 250 is a modified connector block that includes a center portion 252 having opposing faced guide pins 254 creating an electrical path through the center of block 250. Such an arrangement as shown in FIG. 3C is configured to be used in connection with two female versions of connector 11 shown above. Here connector 11 has a housing 12, a strain relief backing 14, a quick disconnect press release 16, front end ferrule 20. As noted above, connector 11 has two locating pin arrangements 26A and 26B which are configured to receive opposing locating guide pins.

As shown in FIG. 3C, connection block 250 is fit between two female connectors 11, with each of opposing faced guide pins 254A/254B fitting into the corresponding guide slots 26A and 26B on each connector 10. As with the arrangement shown in FIG. 1C, locating pin slot 26A is configured to supply positive voltage to an appropriately sized receptacle located in the adjoined connector 11 which in this case would pass through connection block 250 via pins 254. The second locating pin slot 26B (and associated socket in an adjoining connector) provides the neutral circuit path. As shown in FIGS. 3B and 3C (as well as FIG. 1C), corresponding current carrying wires 28A and 28B connect the back end of guide pins 26A and 26B and extend through housing 12 and strain relief backing 14 out through the rear of connector 10.

Figure 3D:
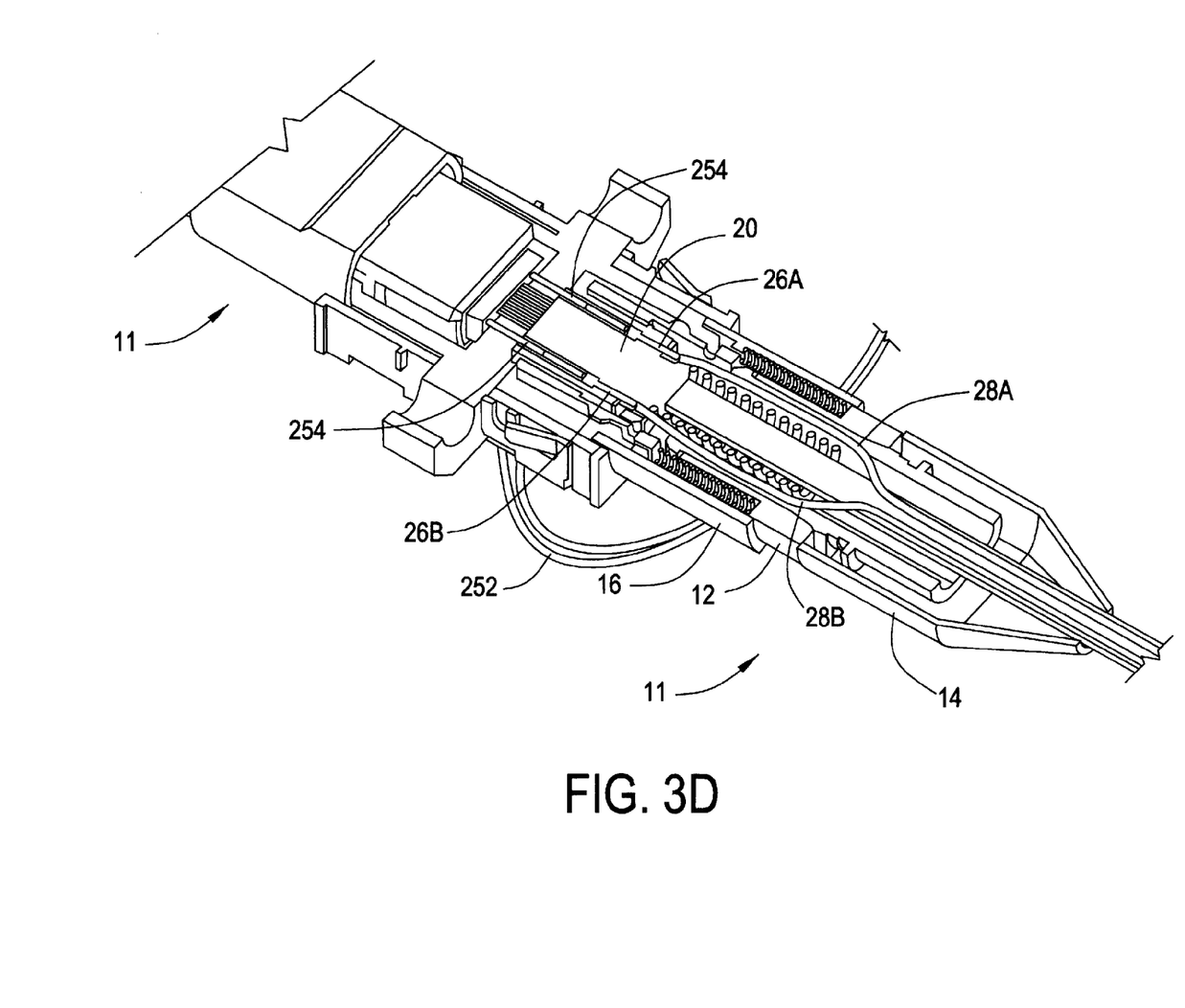

Another arrangement is shown in FIG. 3D where connection block 250 is configured to inject power through the adapter block via a power connection 252. In this case one of connectors 11 could be a typical non-power type MPO connector and the other connector 11 on the other side of block 250 would be the power transmitting type as described above. Such an arrangement would allow power to be added in the middle of a current path rather than from one of the two end points.

In another embodiment, the present arrangement may include a different configuration where the power couplings between connectors is not run though the guide pins themselves but through an additional connection component away from and Insulated from the ferrule. Such an arrangement provides further protection for the fibers in the ferrule from interference caused by the power transmission.

Figures 4A, 4B:
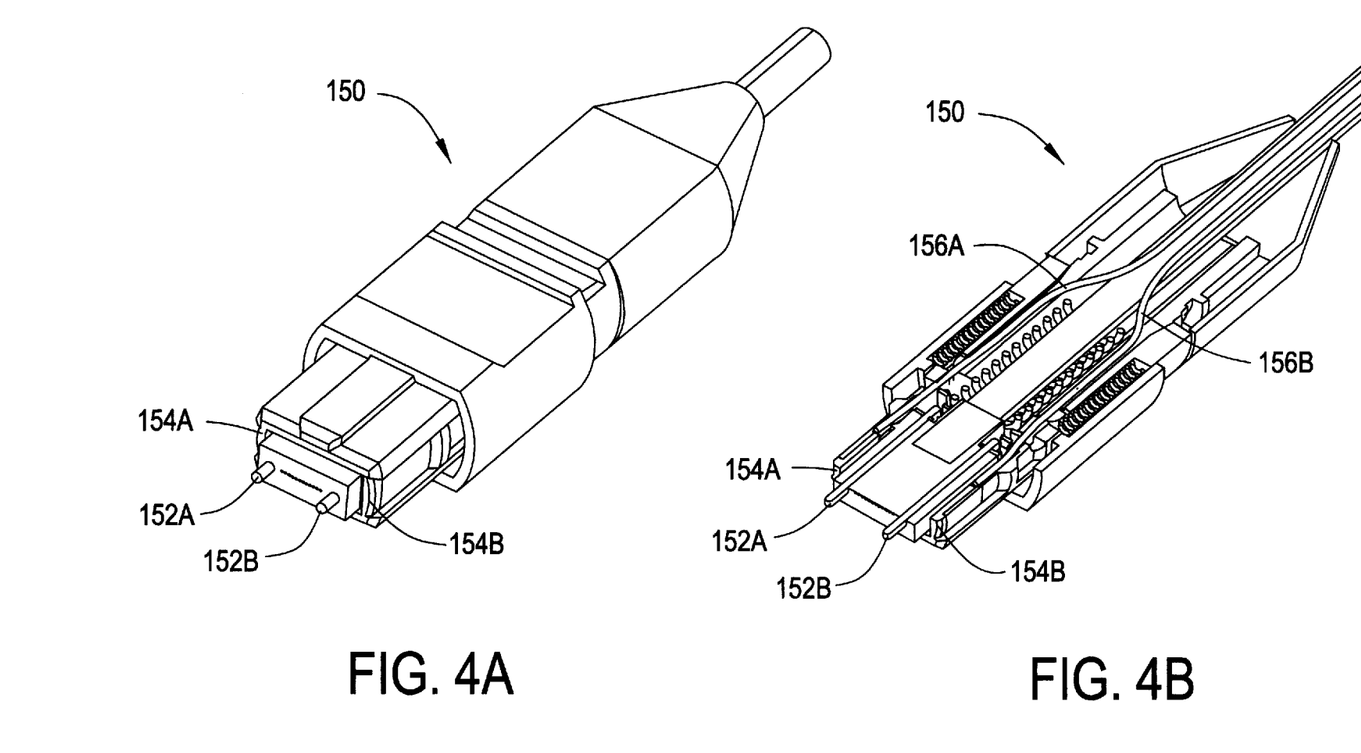
FIGS. 4A and 4B illustrate another example of a power supporting fiber optic connector, in accordance with one embodiment.

For example, FIGS. 4A and 4B each show connector 150 is provided with locating pins 152A and 152B as above. However, rather than using the locating pins to provide voltage paths, metal contacts/connectivity elements 154A/154B are coupled to electrical connection components 156A/156B that extend back through the housing. As such, rather than the current paths for the electrically supporting connector passing through the housing near the ferrule/fibers, metal contacts/connectivity elements 154A/154B are isolated from the fibers on the outside of the housing with associated necessary insulation.

Figure 5:
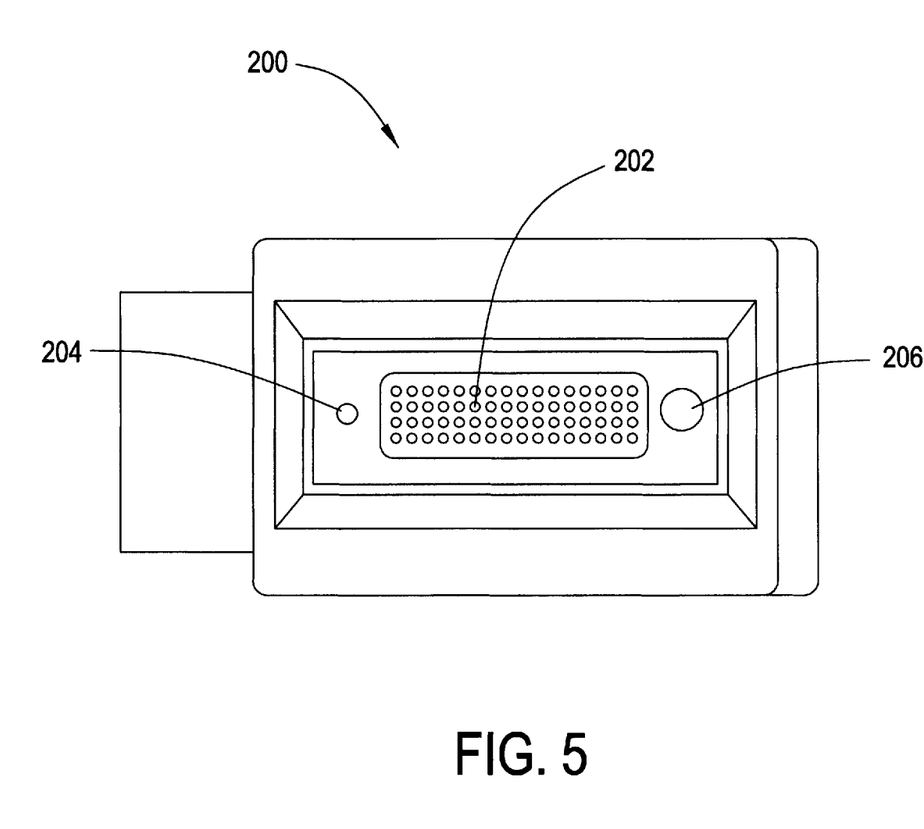
FIG. 5 illustrates a front view of another example of a power supporting fiber optic connector and connection block, in accordance with one embodiment.

The above described examples show the present arrangement as an improvement to MPO type connectors. However, the present arrangement is equally applicable to MPX type multi-fiber connectors. MPX type connectors handle connections with up to 64 fibers. FIG. 5 illustrates an exemplary MPX type connector 200 having a ferrule/fiber support 202 as with MPO connectors. However, unlike MPO connectors, MPX connector 200 has one guide pin 204 and one guide pin slot 206. As such, the present arrangement adjusts the relevant wiring such that connector 200 is arranged so as to have electrical continuity provided from the cable to guide pin 204 with a corresponding electrical arrangement for guide slot 206. In this way, as with the above arrangements each of guide pin 204 and guide slot 206 has a corresponding electrical connection (not shown). It is understood that the present arrangement could be equally applicable to other multi-fiber connectors besides MPO and MPX, such as MXC and MTP type connectors.

Figure 6:
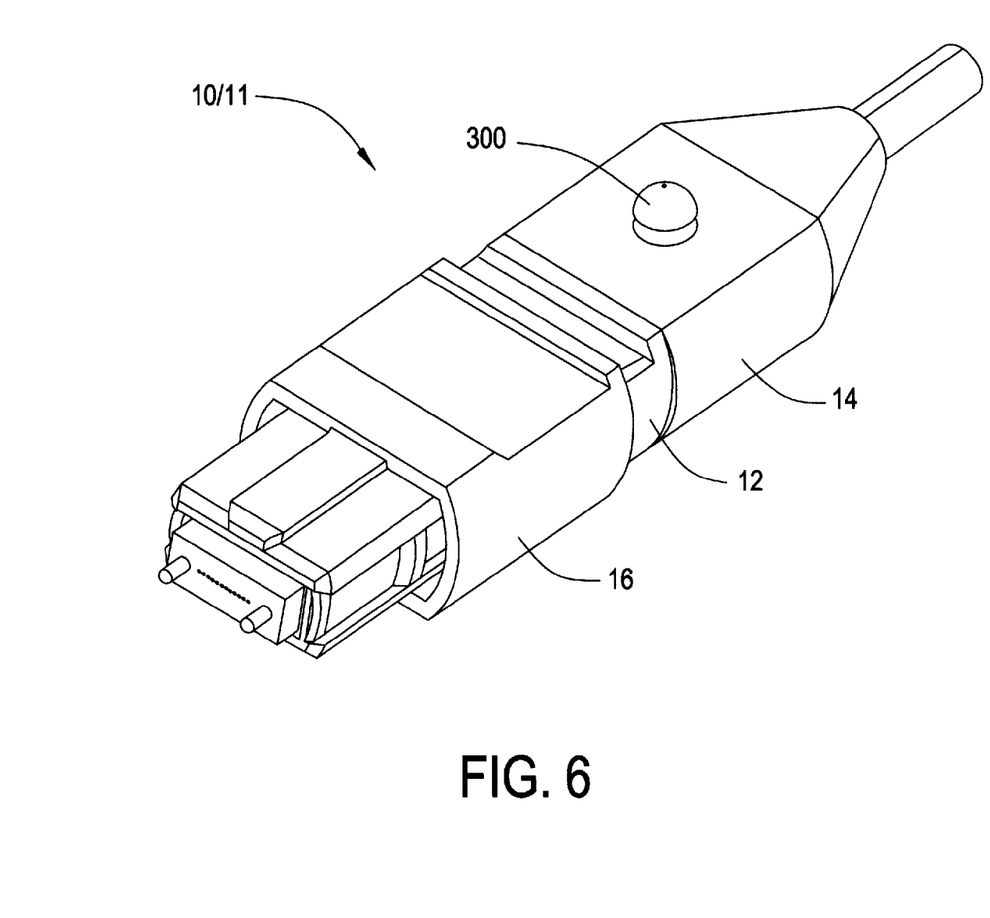
FIG. 6 illustrates another example of a power supporting fiber optic connector with a light, in accordance with one embodiment.

In another embodiment, the above described features of a powered MPO type fiber optic connector 10 can be further used to power a small light or LED 300 on connector housing 12/strain relief 14 as shown in FIG. 6. Such an LED could be used to provide light for the operator when making connections, could be used to ensure proper connectivity or as an indicator of a connection fault.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

The invention claimed is:

1. A fiber optic connector for a multi fiber cable comprising:
 a housing;
 a strain relief;
 a ferrule;
 two guide pin arrangements configured to accept guide pins extending outward from a front surface of an opposing connector; and
 a conductor coupled to each of said guide pin arrangements, configured to conduct electricity to said guide pin arrangements.

2. The fiber optic connector as claimed in claim 1, wherein said conductors coupled to each of said guide pin arrangement is an electrically conducive wire passing through said housing and strain relief.

3. The fiber optic connector as claimed in claim 1, wherein said conductors coupled to each of said guide pin arrangement is configured to separately provide both of the electrical current paths for said conductors.

4. The fiber optic connector as claimed in claim 1,
wherein said conductors coupled to each of said guide pin arrangement is configured to collectively provide one of the electrical current paths for said conductors.

5. The fiber optic connector as claimed in claim 1, wherein said connector further comprises an LED in the housing and/or strain relief, powered by said conductor within said connector.

6. A fiber optic connector for a multi fiber cable comprising:
- a housing;
- a strain relief;
- a ferrule;
- two guide pin fixtures extending outward from a front surface of said housing and configured to be inserted into guide pin arrangements from an opposing connector, and
- a conductor coupled to each of said guide pin fixtures, configured to conduct electricity to said guide pin fixtures.

7. The fiber optic connector as claimed in claim 6,
wherein said conductor coupled to each of said guide pins is an electrically conducive wire passing through said housing and strain relief.

8. The fiber optic connector as claimed in claim 6,
wherein said conductor coupled to each of said guide pins is configured to separately provide both of the electrical current paths for said conductors.

9. The fiber optic connector as claimed in claim 6,
wherein said conductor coupled to each of said guide pins is configured to collectively provide one of the electrical current paths for said conductors.

10. The fiber optic connector as claimed in claim 6, wherein
said connector further comprises an LED in the housing and/or strain relief, powered by said conductor within said connector.

11. Fiber optic connectors and adapter arrangement for us with multi fiber cable comprising:
- at least two connectors each having:
- a housing;
- a strain relief;
- a ferrule;
- two guide pin arrangements configured to accept a guide pins extending outward from a front surface of an opposing connector;
- conductors coupled to each of said guide pin arrangements, configured to conduct electricity to said guide pin arrangements; and
- a connection block having two connection pins thereon, said connection pins bridging between guide pin arrangements on a first connector and guide pin arrangements on a second connector.

12. A fiber optic connector for a multi fiber cable comprising:
- a housing;
- a strain relief;
- a ferrule;
- at least one guide pin arrangement configured to accept guide pins extending outward from a front surface of an opposing connector;
- at least one neutral path component independent of said at least one guide pin arrangement; and
- conductors coupled to said guide pin arrangement and said neutral path component configured to conduct electricity to said guide pin arrangements and neutral path components.

* * * * *